Figure 1:
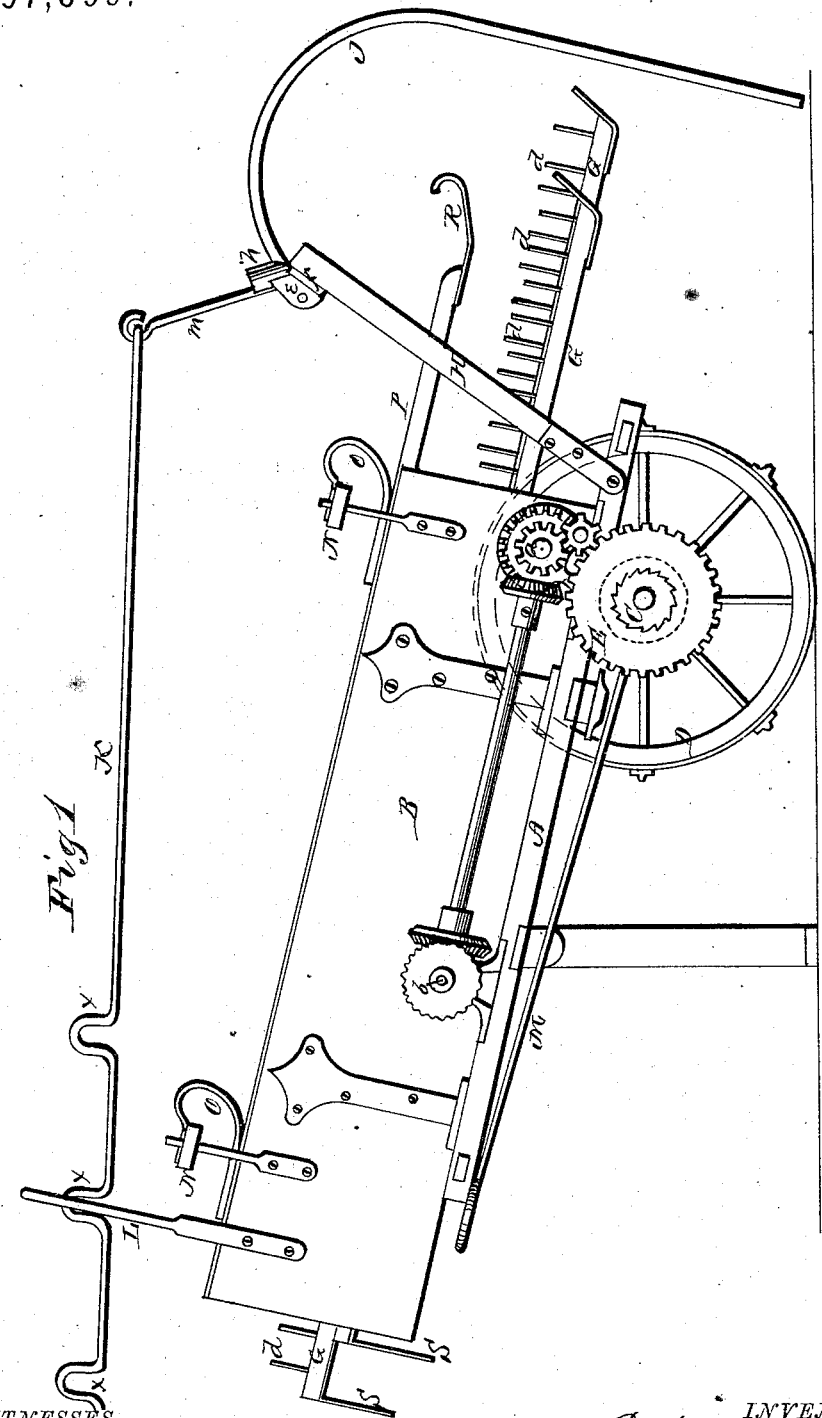

E. R. WHITNEY.
Hay-Loaders.

No. 157,899.

3 Sheets--Sheet 1.

Patented Dec. 15, 1874.

WITNESSES
Franck L. Ourand
C. L. Everk,

INVENTOR
E. R. Whitney,
By Alexander Mason
Attorney

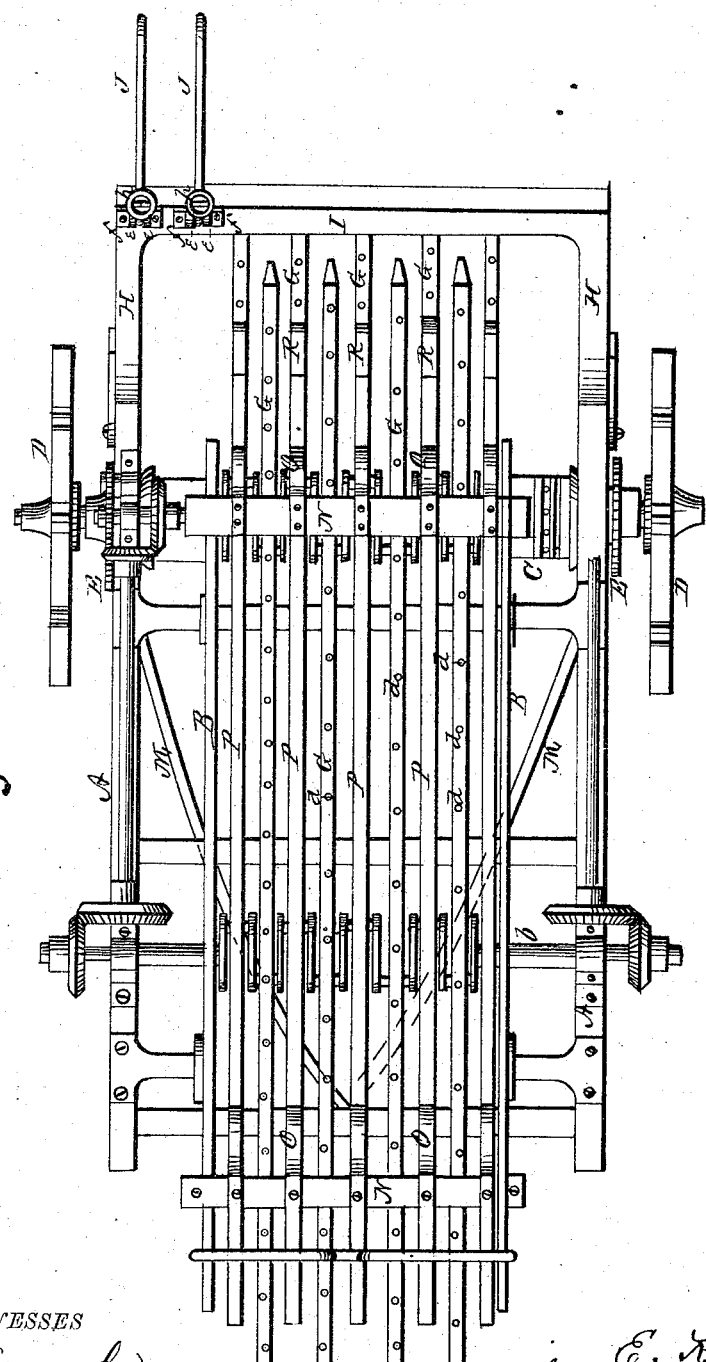

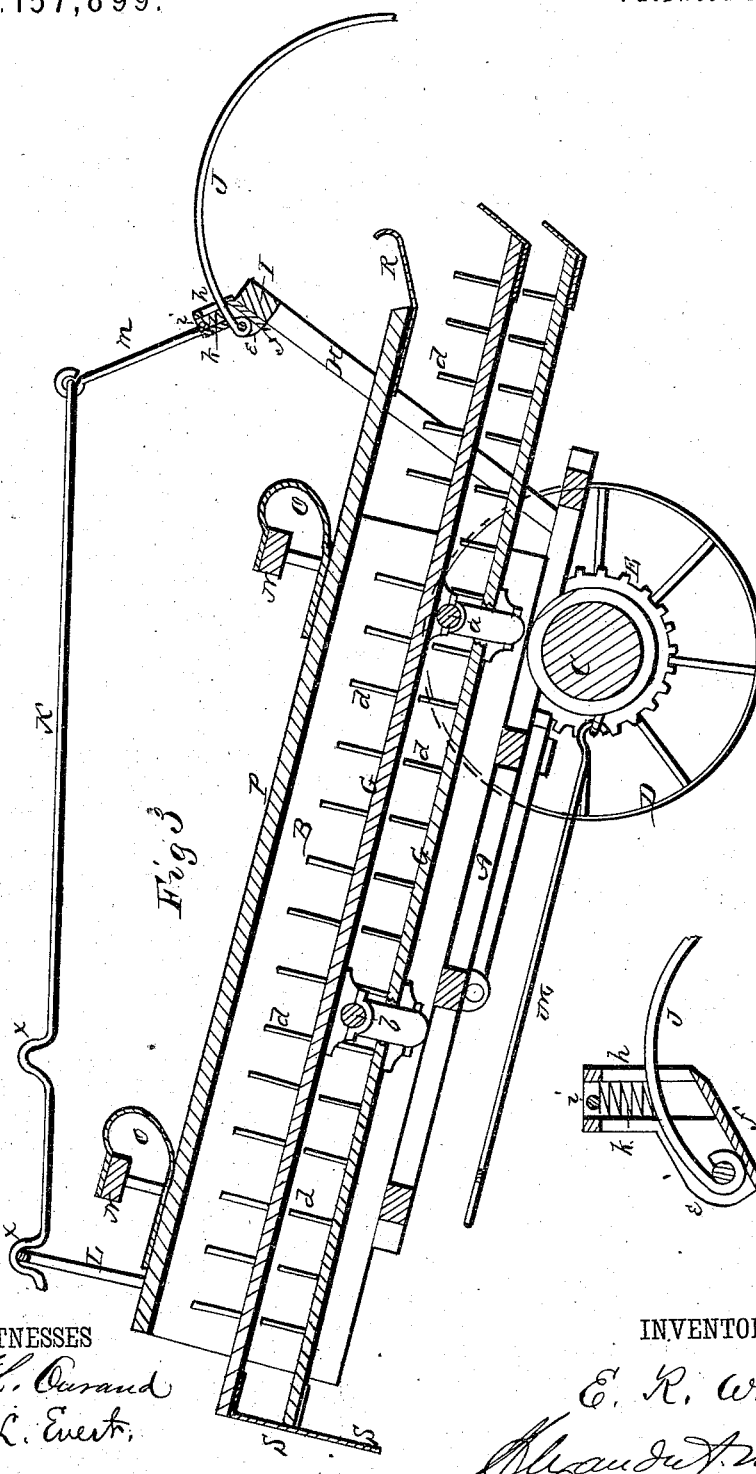

UNITED STATES PATENT OFFICE.

EDWIN R. WHITNEY, OF MAGOG, CANADA.

IMPROVEMENT IN HAY-LOADERS.

Specification forming part of Letters Patent No. 157,899, dated December 15, 1874; application filed June 11, 1874.

*To all whom it may concern:*

Be it known that I, EDWIN R. WHITNEY, of Magog, in the Province of Quebec, Canada, have invented certain new and useful Improvements in Hay-Loaders; and do hereby declare that the following is a full, clear, and exact description thereof, reference being had to the accompanying drawings and to the letters of reference marked thereon, making a part of this specification.

My invention relates to that class of hay and grain loaders, which are attached to the hind end of an ordinary wagon, and are provided with a series of rakes operating alternately to take the hay or grain from the gathering-rake and convey it up into the wagon; and the nature of my invention consists, first, in spring-guides attached to the rear or lower ends of the flexible or yielding bars. My invention further consists in downward-projecting feet attached to the upper or front ends of the conveying-rakes. It also consists in the combination of a series of bars suspended by springs at each end with the conveying and gleaning rakes, all as hereinafter more fully set forth.

In order to enable others skilled in the art to which my invention appertains to make and use the same, I will now proceed to describe its construction and operation, referring to the annexed drawings, in which—

Figure 1 is a side elevation of a hay or grain loader embodying my invention, one driving-wheel being removed. Fig. 2 is a plan view, and Fig. 3 a longitudinal vertical section, of the same.

A represents the frame of my hay-loader provided with suitable box-sides B B and bearings on the under side near the rear end for the reception of the axle C, upon each end of which is a driving-wheel, D. The wheels D are, by ordinary ratchet devices, connected with gear-wheels E, and these by suitable gearing, or by band-wheels, connected with two shafts, $a$ and $b$, for rotating the same. These shafts are provided with a series of cranks set alternately in opposite directions, and upon these cranks are attached a series of bars, G G, each provided with upward-projecting teeth or pins $d\ d$ forming conveying-rakes. In place of the cranks of the shafts $a$ $b$ I may use a series of eccentrics set at varying angles upon the shafts, and connect the rakes G $d$ to said eccentrics by straps or bands. In either case every alternate rake is moving upward and forward, while the others are moving downward and backward. Near the rear end, on each side of the frame A, is pivoted an arm, H, and the outer ends of these arms are connected by a cross-bar, I. Upon this cross-bar are secured a series of plates, $f$. Each plate is provided with an upward-projecting tubular standard, $h$, and two ears, $e\ e$, in front thereof. J J represent the teeth of the gathering-rake, made of spring-wire, bent in any of the known and usual ways. The upper end of each tooth is passed through vertical slots in a tube or standard, $h$, and is pivoted between the ears $e\ e$. In the tube $h$ above the tooth is placed a spiral spring, $k$, which is held therein by means of a pin, $i$, passing through the upper end of the tube. Each tooth is by these means rendered yielding or flexible independent of the others. From the cross-bar or rake-head I extends an arm, $m$, to which is attached a lever or rod, K. This rod extends forward over the top of the machine, and connects by bends or loops $x$ with a frame, L, attached to the front ends of the box-sides B B. By means of this rod the man on the load can adjust the gathering-rake in any desired position, or raise it entirely up from the ground when required. M represents the draft rod or bail, connecting the axle C with the hind axle of the wagon, to which the loader is attached, the front end of the frame A resting on the hind end of the wagon-box. N N represent two cross-bars, elevated above and connected to the box-sides B B by suitable standards, as shown. From these cross-bars are suspended a series of bars, P P, by means of springs O O, said bars running lengthwise of the machine. The bars P P hold the hay or grain down upon the rakes G $d$ as it is carried upward by them, and at the same time give or yield, according to the quantity of the hay or grain on said rakes. These flexible or yielding bars facilitate the work of the rakes, and cause them to carry up the hay or grain with great rapidity and without any danger of its slipping back again. To the rear end of each bar P is attached a spring-arm, R, bent or curved upward, substantially as shown in Figs. 1 and 3, which arms form yielding guides to facilitate the entrance of the hay or grain under the bars. To the front end of each of the rakes G d is attached a downward-projecting bar or foot, S, as shown. These feet push the hay or grain up into the wagon, and prevent it from moving backward under the front ends of the rakes.

Having thus fully described my invention, what I claim as new, and desire to secure by Letters Patent, is—

1. The spring-arms R R, attached to the rear ends of the yielding pressure-bars P P, substantially as and for the purposes herein set forth.

2. The feet S S, attached to the front ends of the rakes G d, substantially as and for the purposes herein set forth.

3. The combination of the bars P, suspended by the springs O O, and the conveying-rake G d, and the gleaning-rake I J, all substantially as and for the purposes set forth.

In testimony that I claim the foregoing I have hereunto set my hand this 11th day of June, 1874.

E. R. WHITNEY.

Witnesses:
   J. TYLER POWELL,
   C. L. EVERT.